US011930584B2

(12) United States Patent
Segawa

(10) Patent No.: US 11,930,584 B2
(45) Date of Patent: Mar. 12, 2024

(54) PLASMA ACTUATOR

(71) Applicant: National Institute of Advanced Industrial Science and Technology, Tokyo (JP)

(72) Inventor: Takehiko Segawa, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 198 days.

(21) Appl. No.: 17/638,241

(22) PCT Filed: Aug. 21, 2020

(86) PCT No.: PCT/JP2020/031635
§ 371 (c)(1),
(2) Date: Feb. 25, 2022

(87) PCT Pub. No.: WO2021/039632
PCT Pub. Date: Mar. 4, 2021

(65) Prior Publication Data
US 2022/0304133 A1     Sep. 22, 2022

(30) Foreign Application Priority Data
Aug. 28, 2019   (JP) .................................. 2019-155622

(51) Int. Cl.
*H05H 1/24*       (2006.01)
(52) U.S. Cl.
CPC .................................. *H05H 1/2425* (2021.05)
(58) Field of Classification Search
CPC .. H05H 1/2425; H05H 1/2439; B64C 23/005; B64C 2230/12; F15D 1/0075
See application file for complete search history.

(56) References Cited

U.S. PATENT DOCUMENTS

2004/0095705 A1* 5/2004 Mills ..................... G21D 7/00
                                                         361/230
2016/0290223 A1* 10/2016 Mills ..................... F02B 65/00
2017/0104426 A1* 4/2017 Mills ................... H01L 31/0549

FOREIGN PATENT DOCUMENTS

JP         2019117792 A  *  7/2019  ............... C01B 3/00
WO   WO-2015184252 A1  * 12/2015  ............... C25B 1/04

OTHER PUBLICATIONS

Sato, S. et al., "Successively Accelerated Ionic Wind with Integrated Dielectric-Barrier-Discharge Plasma Actuator for Low Voltage Operation", Scientific Reports, (2019), 9:5813.

* cited by examiner

*Primary Examiner* — Abdullah A Riyami
*Assistant Examiner* — Syed M Kaiser
(74) *Attorney, Agent, or Firm* — Shih IP Law Group, PLLC

(57) ABSTRACT

A plasma actuator includes: a dielectric layer; a first electrode provided on the obverse surface of the dielectric layer; a second electrode provided, on the reverse-surface side of the dielectric layer, in one direction from the first electrode; a floating conductor pair that is provided between the first electrode and the second electrode and that has an obverse-surface conductor provided on the obverse surface of the dielectric layer and a reverse-surface conductor provided on the reverse-surface side of the dielectric layer, the obverse-surface conductor and the reverse-surface conductor being electrically connected to each other, electrically insulated from the first electrode and the second electrode, and positioned in the order of the reverse-surface conductor and the obverse-surface conductor in the one direction from the first electrode in plan view; and a power source connected to the first electrode and the second electrode.

15 Claims, 12 Drawing Sheets

PLASMA ACTUATOR

TECHNICAL FIELD

The present invention relates to a fluid control technique for a moving body such as a passenger vehicle, a rapid train, and an aircraft, and a high-velocity rotating body such as fluid machinery. In particular, the present invention relates to a plasma actuator that induces a jet air flow by dielectric barrier discharge.

BACKGROUND ART

A plasma actuator allows an induced flow to be produced along a front surface of an insulator in a direction from one electrode disposed on the front surface of the insulator to another electrode disposed on a back surface of the insulator by applying an AC high-voltage between both the electrodes to thereby produce dielectric barrier discharge.

Since the plasma actuator is advantageous such as the plasma actuator has a simple structure, is light-weight, and can be thinly formed, applications of the plasma actuator to a moving body such as a passenger vehicle, a rapid train, and an aircraft, a high-velocity rotating body such as fluid machinery, a windmill of a wind power generator, and the like have been discussed.

Experiments of a plasma actuator that produces a strong unidirectional ionic wind by an applied voltage waveform and an electrode arrangement have been conducted for practical applications (for example, see Non-Patent Literature (hereinafter referred to as "NPL") 1).

CITATION LIST

Non-Patent Literature

NPL 1
Sato, S. et al., "Successively Accelerated Ionic Wind with Integrated Dielectric-Barrier-Discharge Plasma Actuator for Low Voltage Operation", Scientific Reports, (2019), 9:5813

SUMMARY OF INVENTION

Technical Problem

An object of the present invention is to provide a plasma actuator capable of enhancing an induced flow velocity efficiently.

Solution to Problem

An aspect of the present invention provides a plasma actuator that allows an induced flow to be generated. The plasma actuator includes: a dielectric layer; a first electrode provided on a front surface of the dielectric layer; a second electrode provided on a side of a back surface of the dielectric layer in one direction from the first electrode; a floating conductor pair provided between the first electrode and the second electrode and including a front surface conductor disposed on the front surface of the dielectric layer and a back surface conductor disposed on the side of the back surface of the dielectric layer; and a power supply connected to the first electrode and the second electrode. The front surface conductor and the back surface conductor are electrically connected to each other and are electrically insulated from the first electrode and the second electrode. The back surface conductor and the front surface conductor are disposed in this order in the one direction from the first electrode in plan view. The plasma actuator allows the induced flow to be produced along the front surface of the dielectric layer in the one direction from the first electrode by applying a high-frequency high voltage between the first electrode and the second electrode by the power supply to thereby generate dielectric barrier discharge on the front surface between the first electrode and the back surface conductor and on the front surface between the front surface conductor and the second electrode.

According to the above aspect, the floating conductor pair including the front surface conductor and the back surface conductor which are electrically connected to each other is provided between the first electrode and the second electrode so that the dielectric barrier discharge (DBD) is generated at two positions on the front surface between the first electrode and the back surface conductor and on the front surface between the front surface conductor and the second electrode when the high-frequency high voltage is applied between the first electrode and the second electrode by the power supply. Since the direction from the first electrode to the back surface conductor and the direction from the front surface conductor to the second electrode are the same direction, the induced flow produced by the DBD generated on the front surface between the first electrode and the back surface conductor is accelerated by the DBD produced on the front surface between the front surface conductor and the second electrode. Thus, the plasma actuator of the above aspect is capable of enhancing an induced flow velocity efficiently.

Another aspect of the present invention provides a plasma actuator that allows an induced flow to be generated. The plasma actuator includes: a dielectric layer; a first electrode and a third electrode that are provided on a front surface of the dielectric layer; a second electrode and a fourth electrode that are provided on a side of a back surface of the dielectric layer; a first floating conductor pair provided between the first electrode and the second electrode and including a first front surface conductor disposed on the front surface of the dielectric layer and a first back surface conductor disposed on the side of the back surface of the dielectric layer; a second floating conductor pair provided between the third electrode and the fourth electrode and including a second front surface conductor disposed on the front surface of the dielectric layer and a second back surface conductor disposed on the side of the back surface of the dielectric layer; and a power supply connected to the first electrode, the second electrode, the third electrode, and the fourth electrode. The second electrode, the third electrode, and the fourth electrode are disposed in this order in one direction from the first electrode in plan view. The first back surface conductor and the first front surface conductor are disposed in this order in the one direction from the first electrode in plan view. The first front surface conductor and the first back surface conductor are electrically connected to each other and are electrically insulated from the first electrode and the second electrode. The second back surface conductor and the second front surface conductor are disposed in this order in the one direction from the third electrode in plan view. The second front surface conductor and the second back surface conductor are electrically connected to each other and are electrically insulated from the third electrode and the fourth electrode. The plasma actuator allows the induced flow to be produced along the front surface of the dielectric layer in the one direction from the first electrode by applying a high-frequency high voltage between the first electrode and the second electrode and between the third electrode and the fourth electrode by the power supply to thereby generate dielectric barrier discharge on each of the front surface of the dielectric layer between the first electrode and the first back surface conductor, the front surface of the dielectric layer between the first front surface conductor and the second electrode, the front surface of the dielectric layer between the third electrode and the second back surface conductor, and the front surface of the dielectric layer between the second front surface conductor and the fourth electrode.

According to the above aspect, the first floating conductor pair is provided between the first electrode and the second electrode and the second floating conductor pair is provided between the third electrode and the fourth electrode, respectively, so that the dielectric barrier discharge (DBD) is generated at four positions on the front surface of the dielectric layer between the first electrode and the first back surface conductor, on the front surface of the dielectric layer between the first front surface conductor and the second electrode, on the front surface of the dielectric layer between the third electrode and the second back surface conductor, and on the front surface of the dielectric layer between the second front surface conductor and the fourth electrode when the high-frequency high voltage is applied between the first electrode and the second electrode and between the third electrode and the fourth electrode by the power supply. Since the direction from the first electrode to the first back surface conductor, the direction from the first front surface conductor to the second electrode, the direction from the third electrode to the second back surface conductor, and the direction from the second front surface conductor to the fourth electrode are all the same direction, the induced flow produced by the DBD generated on the front surface of the dielectric layer between the first electrode and the first back surface conductor is accelerated by the DBD produced at the other three positions described above. Thus, the plasma actuator of the above aspect is capable of enhancing an induced flow velocity efficiently.

DESCRIPTION OF EMBODIMENTS

Figure 1:
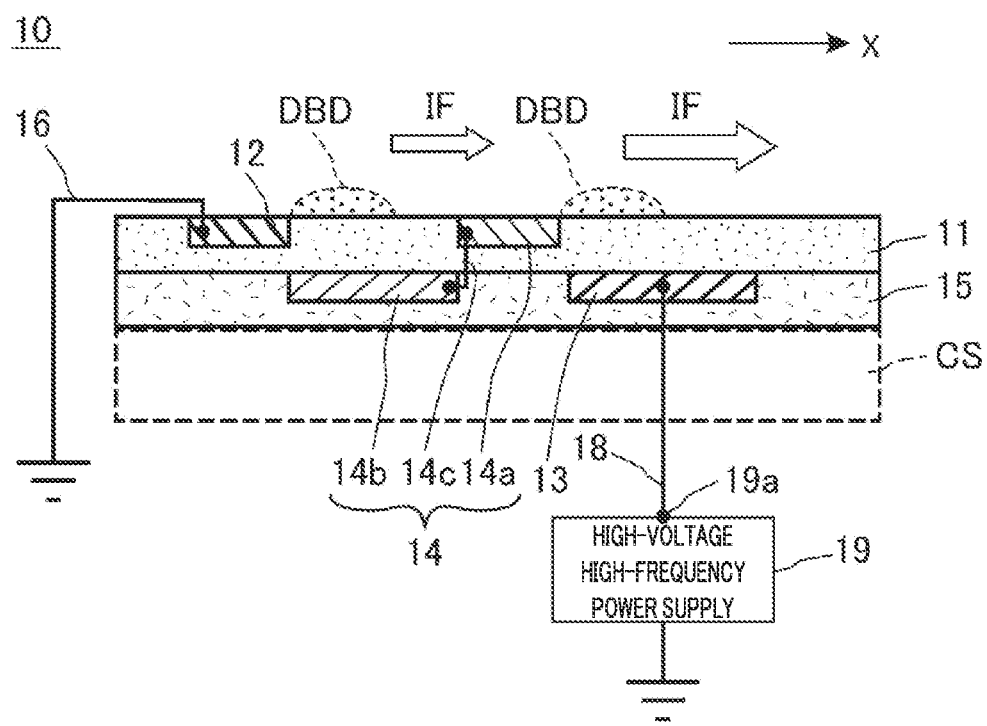
FIG. 1 is a cross-sectional view illustrating a schematic configuration of a plasma actuator according to Embodiment 1 of the present invention.

Hereinafter, embodiments of the present invention will be described with reference to the accompanying drawings. Note that, a common element in the drawings will be denoted by the same reference sign, and a repetition of a detailed description of the element will be omitted.

Figure 2:
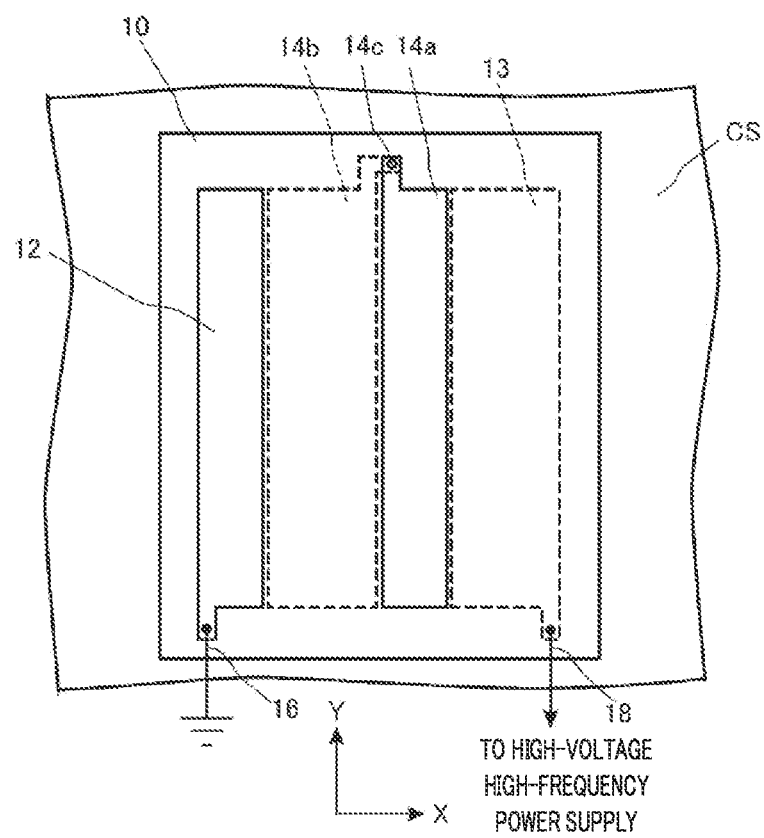
FIG. 2 is a plan view illustrating the schematic configuration of the plasma actuator according to Embodiment 1 of the present invention.

FIG. 1 is a cross-sectional view illustrating a schematic configuration of a plasma actuator according to Embodiment 1 of the present invention, and FIG. 2 is a plan view illustrating the same. Referring to FIGS. 1 and 2, plasma actuator 10 is attached to a front surface of a target object, for example, casing CS of a vehicle. Plasma actuator 10 includes dielectric layer 11, front surface electrode 12 provided on a front surface of dielectric layer 11, back surface electrode 13 provided on a side of a back surface of dielectric layer 11 in a direction in which an induced flow along the front surface is generated from front surface electrode 12, floating conductor pair 14 provided between front surface electrode 12 and back surface electrode 13, and high-voltage high-frequency power supply 19 in which output part 19*a* is connected to back surface electrode 13 via wiring 18. Front surface electrode 12 is grounded via wiring 16.

Floating conductor pair 14 includes front surface conductor 14*a* disposed on the front surface of dielectric layer 11, back surface conductor 14*b* disposed on the side of the back surface of dielectric layer 11, and wiring part 14*c* that electrically connects front surface conductor 14*a* and back surface conductor 14*b*. Front surface conductor 14*a* and back surface conductor 14*b* are electrically insulated from front surface electrode 12 and back surface electrode 13 by dielectric layer 11 and sealing layer 15, and are electrically connected by wiring part 14*c*, for example, a through-hole, to have the same potential. Floating conductor pair 14 is, that is, front surface conductor 14*a* and back surface conductor 14*b* are in a state of electrically floating.

In plasma actuator 10, front surface electrode 12, back surface conductor 14*b*, front surface conductor 14*a*, and back surface electrode 13 are disposed in this order in a direction in which an induced flow is produced (the X direction indicated in FIGS. 1 and 2) in plan view. In accordance with a range in which an induced flow is generated, front surface electrode 12, back surface electrode 13, back surface conductor 14*b*, and front surface conductor 14*a* extend along the front surface of casing CS, for example, in the Y direction that forms a right angle with respect to the X direction as illustrated in FIG. 2.

Figure 3A:
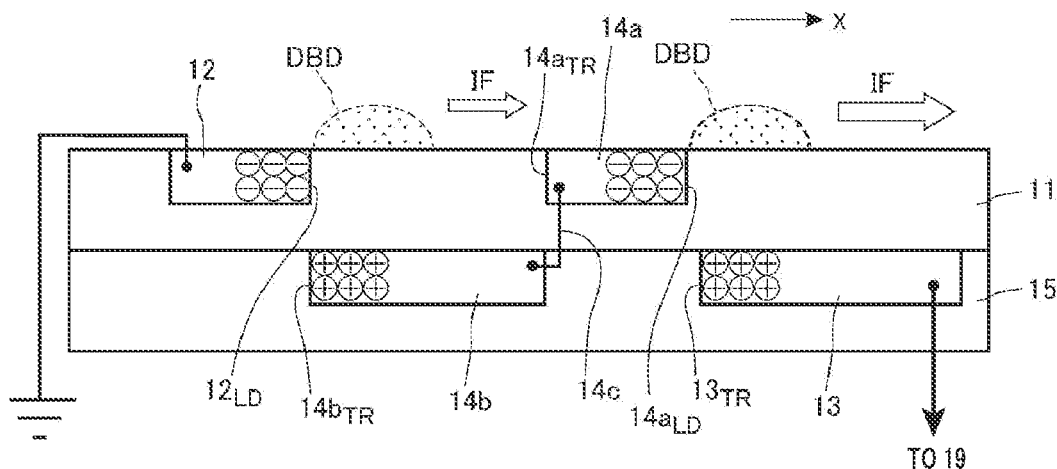
FIGS. 3A and 3B are diagrams for describing an operation of the plasma actuator according to Embodiment 1 of the present invention.
Figure 3B:
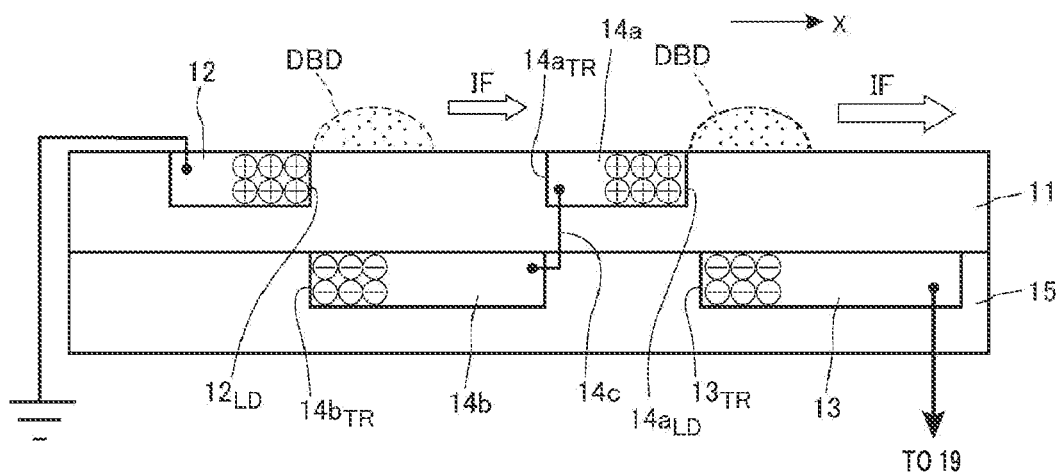

The gap between front surface conductor 14a and front surface electrode 12, that is, the gap between a back end part of front surface conductor 14a and a leading end part of front surface electrode 12 is preferably larger than the gap between back surface conductor 14b and front surface electrode 12, that is, a back end part of back surface conductor 14b and a leading end part of front surface electrode 12 in terms of a charge distribution to be described with FIGS. 3A and 3B being good.

The width of front surface conductor 14a is preferably equal to or shorter than the width of front surface electrode 12 in terms of capability of accelerating an induced flow smoothly. The width indicates the length in the X direction.

High-voltage high-frequency power supply 19 is not particularly limited as long as it is a power supply capable of supplying a high-frequency or pulsed high-voltage signal. The high-voltage signal is a high-frequency or pulsed signal. The frequency is preferably set at 0.05 kHz to 1000 kHz from the viewpoint of practical use in consideration of the apparatus cost of the power supply, and the voltage is preferably set at 0.1 kV to 100 kV.

The forms of front surface electrode 12, back surface electrode 13, back surface conductor 14b, and front surface conductor 14a are not particularly limited. It is preferable in terms of forming a smooth induced flow on the front surface of the dielectric layer that front surface electrode 12 and front surface conductor 14a be flush-mounted in dielectric layer 11 and be disposed such that the front surfaces thereof are exposed. Back surface electrode 13 and back surface conductor 14b are preferably covered with dielectric layer 11 and sealing layer 15 in terms of preventing DBD, spark, and corona discharge from being produced on the side of the back surface. Note that, back surface electrode 13 and back surface conductor 14b may be formed so as to be embedded in dielectric layer 11.

Plasma actuator 10 preferably does not protrude from the front surface of the casing. From this point of view, front surface electrode 12, back surface electrode 13, back surface conductor 14b, and front surface conductor 14a preferably have a thin plate shape or a thin film shape formed of a metallic material such as copper, aluminum, gold, silver, and a conductive oxide such as indium tin oxide (ITO). For dielectric layer 11, an acrylic resin, a silicone rubber, a silicone resin, alumina ceramic, sapphire (high-purity alumina ceramic), polyimide, a polytetrafluoroethylene (PTFE) resin (for example, Teflon (registered trademark)), a PET (polyethylene terephthalate) resin, Pyrex (registered trademark) glass, quartz glass, PEEK, various oils and fats, and the like can be used, for example. For sealing layer 15, a coating/sealing material such as a resist, a silicone rubber, polyimide, and a PTFE resin (for example, Teflon (registered trademark)) can be used, for example. As sealing layer 15, an adhesive agent may also be used, whereby plasma actuator 10 may be attached to the front surface of casing CS. Further, an adhesive layer may also be provided between sealing layer 15 and the front surface of casing CS.

Plasma actuator 10 grounds front surface electrode 12 and electrically connects back surface electrode 13 to output part 19a of high-voltage high-frequency power supply 19. Since high-voltage high-frequency power supply 19 is grounded, a high-voltage signal of a sinusoidal wave of a voltage of ±Vp (where Vp represents one side amplitude of an AC voltage) is applied from output part 19a to back surface electrode 13 so that a voltage of approximately ±½ Vp is applied between front surface electrode 12 and back surface conductor 14b and a voltage of approximately ±½ Vp is applied between front surface conductor 14a and back surface electrode 13, for example. Thus, dielectric barrier discharge (DBD) is generated on the front surface of dielectric layer 11 between front surface electrode 12 and back surface conductor 14b and on the front surface of dielectric layer 11 between front surface conductor 14a and back surface electrode 13. Induced flow IF is produced by the DBD. Note that, since the voltage between front surface electrode 12 and back surface conductor 14b and the voltage between front surface conductor 14a and back surface electrode 13 vary depending on how front surface electrode 12, back surface conductor 14b, front surface conductor 14a, and back surface electrode 13 overlap in plan view and on the thickness of dielectric layer 11 between front surface electrode 12 and back surface conductor 14b and between front surface conductor 14a and back surface electrode 13, the production of induced flow IF may be controlled thereby.

In the above description, plasma actuator 10 grounds front surface electrode 12 and electrically connects back surface electrode 13 to output part 19a of high-voltage high-frequency power supply 19, but conversely may ground back surface electrode 13 and connect front surface electrode 12 to output part 19a of high-voltage high-frequency power supply 19. Experiments demonstrate that even in this case, nearly the same induced flow velocity can be obtained under the same voltage application conditions.

FIGS. 3A and 3B are diagrams for describing an operation of the plasma actuator according to Embodiment 1 of the present invention. FIG. 3A illustrates a charge distribution in a case where a voltage of +Vp is applied to back surface electrode 13, and FIG. 3B illustrates a charge distribution in a case where a voltage of −Vp is applied to back surface electrode 13.

Referring to FIG. 3A, since a voltage of +Vp is applied to back surface electrode 13 and front surface electrode 12 is grounded, an electric field in a direction from back surface electrode 13 to front surface electrode 12 is produced. Floating conductor pair 14 between front surface electrode 12 and back surface electrode 13 has a potential of approximately +½ Vp, for example. Thus, the positive charge moves to a side of back end part $13_{TR}$ (in the −X direction) of back surface electrode 13, the negative charge moves to leading end part $14a_{LD}$ of front surface conductor 14a, the positive charge moves to a side of back end part $14b_{TR}$ (in the −X direction) of back surface conductor 14b, and the negative charge moves to a side of leading end part $12_{LD}$ (in the X direction) of front surface electrode 12. The potential difference thus generated causes an electric field (with a magnitude of approximately −dVp/dx) to be formed near leading end part $12_{LD}$ of front surface electrode 12. The electric field in which partial electrical breakdown of a working fluid (such as air) or the like occurs causes DBD to be generated on the front surface of dielectric layer 11 between front surface electrode 12 and back surface conductor 14b. In the same manner, DBD is generated on the front surface of dielectric layer 11 between front surface conductor 14a and back surface electrode 13. The working fluid is partially ionized by the DBD to generate charged particles. The charged particles are accelerated by a volume force produced by the electric field. Collisions between the charged particles and non-ionized neutral particles are repeated, which results in the production of induced flow IF that is macroscopic. The direction of induced flow IF is a direction from front surface electrode 12 to back surface conductor 14b and a direction from front surface conductor 14a to back surface electrode 13. Both the DBDs induce flows in the same direction (the X direction).

On the other hand, front surface conductor 14a and back surface conductor 14b are connected by wiring part 14c and therefore have the same potential, and no DBD is generated between front surface conductor 14a and back surface conductor 14b. That is, no DBD is generated in the −X direction from back end part $14a_{TR}$ of front surface conductor 14a by front surface conductor 14a and back surface conductor 14b. Accordingly, no induced flow in a direction from front surface conductor 14a to back surface conductor 14b is produced. Thus, the long-standing problem of induced flows colliding with each other due to the presence of a plurality of front surface electrodes, so-called cross-talk, can be solved by plasma actuator 10 of the present embodiment (for the cross-talk, see H. Do et al, Applied Physics Letters, 2008, Vol. 92, 071504, for example).

Referring to FIG. 3B, since a voltage of −Vp is applied to back surface electrode 13 and front surface electrode 12 is grounded, floating conductor pair 14 has a potential of −½ Vp, for example. The charge distribution is opposite to that in FIG. 3A. In the same manner as in FIG. 3A, DBD is generated on the front surface of dielectric layer 11 between front surface electrode 12 and back surface conductor 14b, DBD is generated on the front surface of dielectric layer 11 between front surface conductor 14a and back surface electrode 13, and no DBD is generated between front surface conductor 14a and back surface conductor 14b. The direction of induced flow IF produced by the DBD is the direction from front surface electrode 12 to back surface conductor 14b and the direction from front surface conductor 14a to back surface electrode 13. Both the DBDs induce flows in the same direction (the X direction).

Accordingly, by applying a high-frequency voltage of a voltage of ±Vp, plasma actuator 10 causes DBD to be generated on the front surface of dielectric layer 11 between front surface electrode 12 and back surface conductor 14b, and causes DBD to be generated on the front surface of dielectric layer 11 between front surface conductor 14a and back surface electrode 13. The induced flows produced by these DBDs are produced in a direction from front surface electrode 12 to back surface electrode 13.

According to the present embodiment, floating conductor pair 14 including front surface conductor 14a and back surface conductor 14b that are electrically connected to each other is provided between front surface electrode 12 and back surface electrode 13 so that when a high-frequency high voltage is applied between front surface electrode 12 and back surface electrode 13 by high-voltage high-frequency power supply 19, DBD is generated at two positions on the front surface between front surface electrode 12 and back surface conductor 14b and on the front surface between front surface conductor 14a and back surface electrode 13. Since the direction from front surface electrode 12 to back surface conductor 14b and the direction from front surface conductor 14a to back surface electrode 13 are the same direction, the induced flow produced by the DBD generated on the front surface between front surface electrode 12 and back surface conductor 14b is accelerated by the induced flow produced by the DBD generated on the front surface between front surface conductor 14a and back surface electrode 13. Thus, plasma actuator 10 is capable of enhancing an induced flow velocity efficiently.

Figure 4:
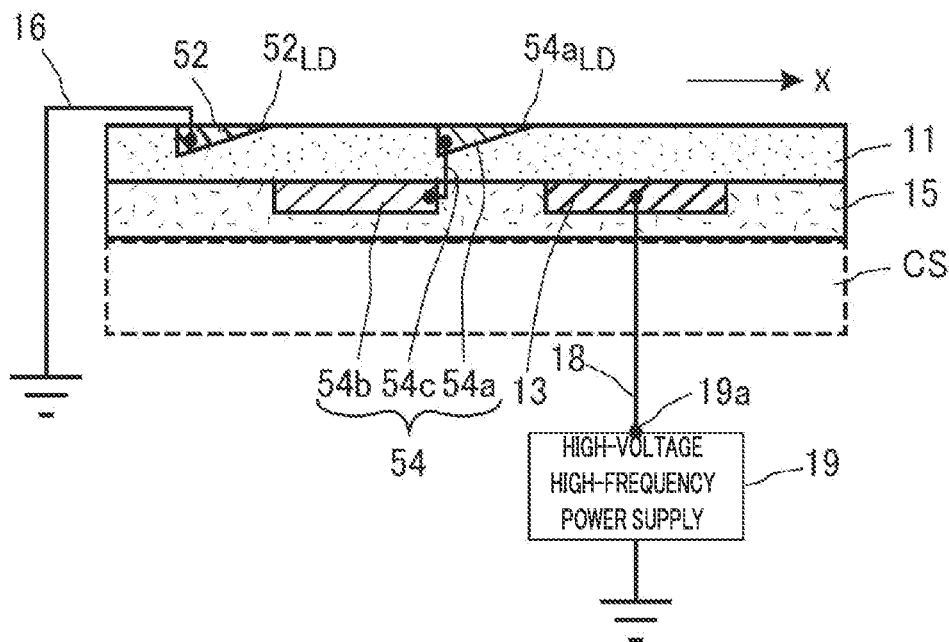
FIG. 4 is a cross-sectional view illustrating a schematic configuration of a variation of the plasma actuator according to Embodiment 1 of the present invention.

FIG. 4 is a cross-sectional view illustrating a schematic configuration of a variation of the plasma actuator according to Embodiment 1 of the present invention. Referring to FIG. 4, plasma actuator 50 includes dielectric layer 11, front surface electrode 52 provided on a front surface of dielectric layer 11, back surface electrode 13 provided on a back surface of dielectric layer 11 in a direction (the X direction) in which an induced flow along the front surface is produced from front surface electrode 52, floating conductor pair 54 provided between front surface electrode 52 and back surface electrode 13, and high-voltage high-frequency power supply 19 connected to front surface electrode 52 and back surface electrode 13 via wirings 16 and 18. Floating conductor pair 54 includes front surface conductor 54a, back surface conductor 54b, and wiring part 54c that electrically connects front surface conductor 54a and back surface conductor 54b. Plasma actuator 50 is a variation of plasma actuator 10 illustrated in FIG. 1. Front surface electrode 52 and front surface conductor 54a include cross sections along the X direction that are formed to be gradually narrowed toward leading end parts 52LD and 54aLD, respectively. Thus, the charge densities of leading end part 52LD of the front surface electrode and leading end part 54aLD of the front surface conductor increase and the electric field strengths of the front surfaces thereof increase so that plasma actuator 50 easily generates DBD even at a lower voltage and is capable of suppressing a voltage to be applied.

Note that, plasma actuator 50 may also ground back surface electrode 13 and connect front surface electrode 52 to output part 19a of high-voltage high-frequency power supply 19. Experiments demonstrate that even in this case, nearly the same induced flow velocity can be obtained under the same voltage application conditions.

Figure 5:
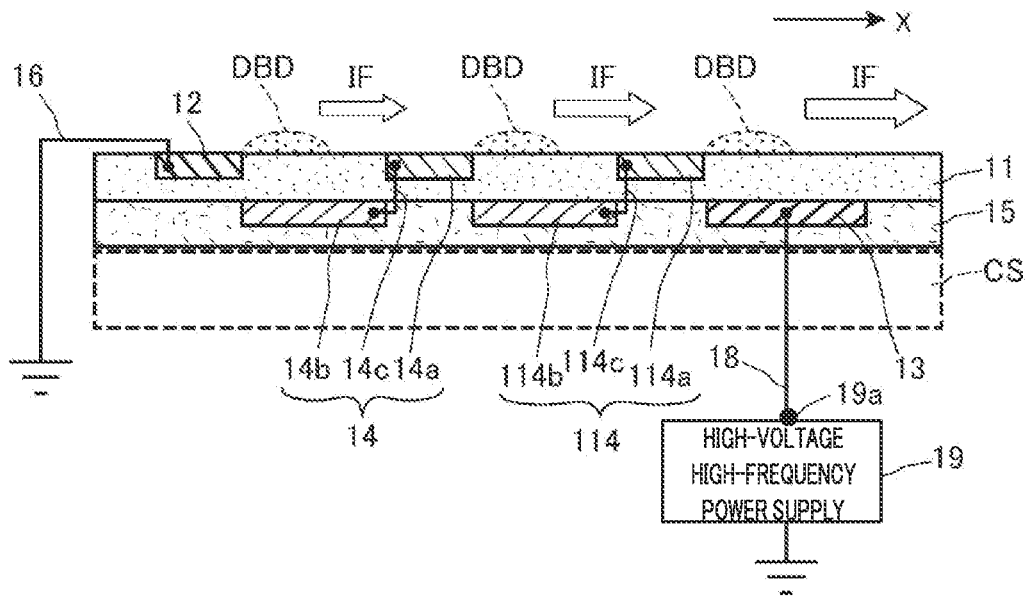
FIG. 5 is a cross-sectional view illustrating a schematic configuration of another variation of the plasma actuator according to Embodiment 1 of the present invention.

FIG. 5 is a cross-sectional view illustrating a schematic configuration of another variation of the plasma actuator according to Embodiment 1 of the present invention. Referring to FIG. 5, plasma actuator 100 includes dielectric layer 11, front surface electrode 12 provided on a front surface of dielectric layer 11, back surface electrode 13 provided on a back surface of dielectric layer 11 in a direction (the X direction) in which an induced flow along the front surface is generated from front surface electrode 12, two floating conductor pairs 14 and 114 provided between front surface electrode 12 and back surface electrode 13, and high-voltage high-frequency power supply 19 in which output part 19a is connected to back surface electrode 13 via wiring 18. Front surface electrode 12 is grounded via wiring 16. Plasma actuator 100 is a variation of plasma actuator 10 illustrated in FIGS. 1 and 2, and is further provided with floating conductor pair 114 between floating conductor pair 14 and back surface electrode 13. Descriptions of the same configurations in plasma actuator 110 as those in plasma actuator 10 will be omitted.

Floating conductor pair 114 has the same configuration as floating conductor pair 14. Floating conductor pair 114 includes front surface conductor 114a disposed on the front surface of dielectric layer 11, back surface conductor 114b disposed on a side of the back surface of dielectric layer 11, and wiring part 114c that electrically connects front surface conductor 114a and back surface conductor 114b. Front surface conductor 114a and back surface conductor 114b are electrically insulated from front surface electrode 12 and back surface electrode 13 by dielectric layer 11 and sealing layer 15, and are electrically connected by wiring part 114c, for example, a through-hole, to have the same potential. Floating conductor pair 114 is in a state of electrically floating.

Plasma actuator 100 grounds front surface electrode 12 via wiring 16 and electrically connects back surface electrode 13 to output part 19a of high-voltage high-frequency power supply 19. Since high-voltage high-frequency power supply 19 is grounded, a high-voltage signal of a sinusoidal wave of a voltage of ±Vp is applied from output part 19a to back surface electrode 13 so that a voltage of approximately ±⅓ Vp is applied between front surface electrode 12 and back surface conductor 14b, a voltage of approximately ±⅓ Vp is applied between front surface conductor 14a and back surface conductor 114b, and a voltage of approximately ±⅓ Vp is applied between front surface conductor 114a and back surface electrode 13, for example Thus, DBD is generated on the front surface of dielectric layer 11 between front surface electrode 12 and back surface conductor 14b, on the front surface of dielectric layer 11 between front surface conductor 14a and back surface conductor 114b, and on the front surface of dielectric layer 11 between front surface conductor 114a and back surface electrode 13. With respect to induced flow IF produced by the DBD generated on the front surface of dielectric layer 11 between front surface electrode 12 and back surface conductor 14b, induced flow IF in the X direction is accelerated by induced flows produced by the other two DBDs along the X direction. Thus, plasma actuator 100 is capable of enhancing a velocity of induced flow IF efficiently.

Note that, although plasma actuator 100 includes floating conductor pair 14 and floating conductor pair 114, a further floating conductor pair(s) may be provided. Thus, the velocity of induced flow IF can be further enhanced by increasing DBD generation positions.

Plasma actuator 100 may ground back surface electrode 13 and connect front surface electrode 12 to output part 19a of high-voltage high-frequency power supply 19. Experiments demonstrate that even in this case, nearly the same induced flow velocity can be obtained under the same voltage application conditions.

Figure 6:
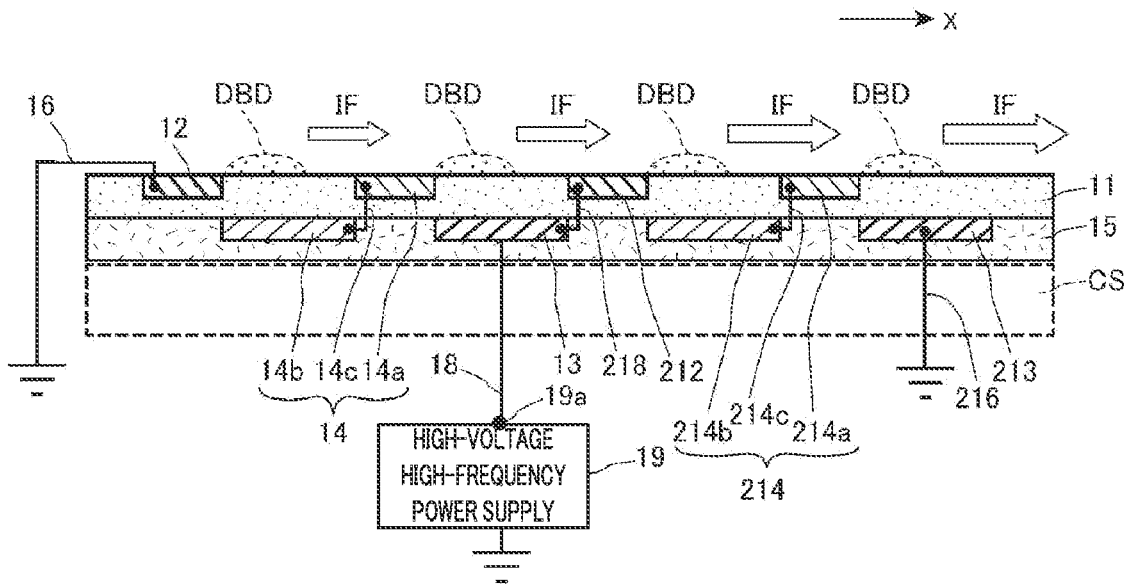
FIG. 6 is a cross-sectional view illustrating a schematic configuration of a plasma actuator according to Embodiment 2 of the present invention.

FIG. 6 is a cross-sectional view illustrating a schematic configuration of a plasma actuator according to Embodiment 2 of the present invention. Referring to FIG. 6, plasma actuator 200 has a configuration in which two plasma actuators 10, where plasma actuator 10 is illustrated in FIG. 1, are combined, and in which output part 19a of high-voltage high-frequency power supply 19 is electrically connected to two electrodes (back surface electrode 13 and front surface electrode 212) close thereto. Plasma actuator 200 includes dielectric layer 11, front surface electrode 12 and front surface electrode 212 provided on a front surface of dielectric layer 11, and back surface electrode 13 and back surface electrode 213 provided on a side of a back surface of dielectric layer 11. In plasma actuator 200, back surface electrode 13, front surface electrode 212, and back surface electrode 213 are disposed in this order in a direction (the X direction) in which an induced flow is produced from front surface electrode 12 in plan view.

Plasma actuator 200 includes floating conductor pair 14 between front surface electrode 12 and back surface electrode 13, and floating conductor pair 214 between front surface electrode 212 and back surface electrode 213. Floating conductor pair 214 has the same configuration as floating conductor pair 14. Floating conductor pair 214 includes front surface conductor 214a disposed on the front surface of dielectric layer 11, back surface conductor 214b disposed on the side of the back surface of dielectric layer 11, and wiring part 214c that electrically connects front surface conductor 214a and back surface conductor 214b. Front surface conductor 214a and back surface conductor 214b are electrically insulated from front surface electrode 212 and back surface electrode 213 by dielectric layer 11 and sealing layer 15, and are electrically connected by wiring part 214c, for example, a through-hole, to have the same potential. Floating conductor pair 214 is in a state of electrically floating.

Back surface electrode 13 is electrically connected to output part 19a of high-voltage high-frequency power supply 19 via wiring 18. Front surface electrode 212 is electrically connected to output part 19a of high-voltage high-frequency power supply 19 via wiring part 218, back surface electrode 13, and wiring 18. Front surface electrode 12 is grounded via wiring 16, and back surface electrode 213 is grounded via wiring 216.

In plasma actuator 200, a high-frequency high voltage is applied from output part 19a of high-voltage high-frequency power supply 19 to back surface electrode 13 and front surface electrode 212 so that DBD is generated on the front surface of dielectric layer 11 between front surface electrode 12 and back surface conductor 14b, on the front surface of dielectric layer 11 between front surface conductor 14a and back surface electrode 13, on the front surface of dielectric layer 11 between front surface electrode 212 and back surface conductor 214b, and on the front surface of dielectric layer 11 between front surface conductor 214a and back surface electrode 13, and induced flow IF is produced by the DBD. As described in Embodiment 1, since induced flow IF is produced all in the same direction by each DBD, induced flow IF is accelerated and plasma actuator 200 is capable of enhancing an induced flow velocity efficiently.

Note that, plasma actuator 200 includes one floating conductor pair 14 and one floating conductor pair 214, respectively, but may be further provided with a plurality of floating conductor pairs 14 and a plurality of floating conductor pairs 214, respectively. Thus, the velocity of induced flow IF can be further enhanced by increasing DBD generation positions.

Plasma actuator 200 may ground back surface electrode 13 and connect front surface electrode 12 and back surface electrode 213 to output part 19a of high-voltage high-frequency power supply 19. Experiments demonstrate that even in this case, nearly the same induced flow velocity can be obtained under the same voltage application conditions.

Figure 7:
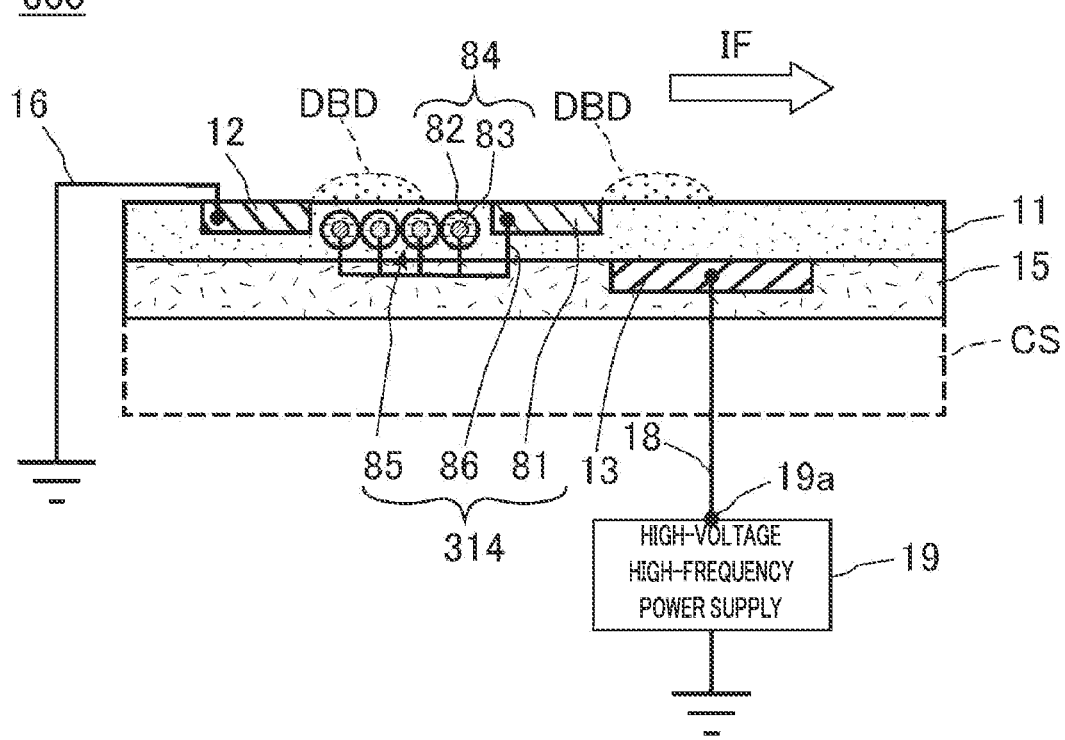
FIG. 7 is a cross-sectional view illustrating a schematic configuration of a plasma actuator according to Embodiment 3 of the present invention.
Figure 8:
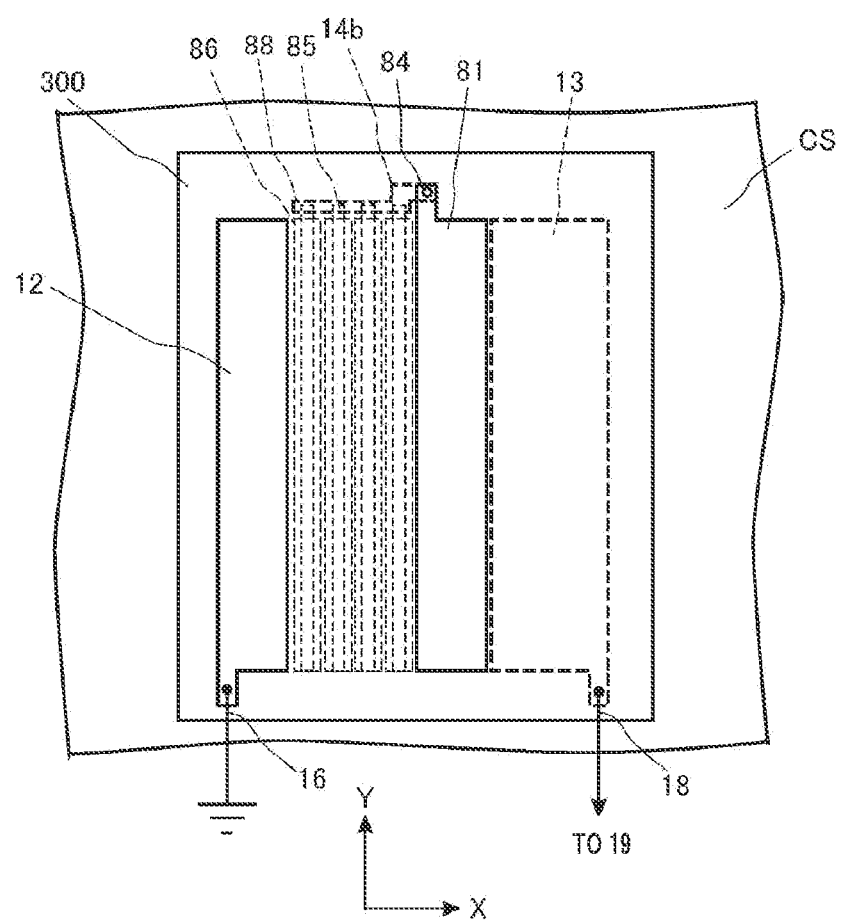
FIG. 8 is a plan view illustrating the schematic configuration of the plasma actuator according to Embodiment 3 of the present invention.

FIG. 7 is a cross-sectional view illustrating a schematic configuration of a plasma actuator according to Embodiment 3 of the present invention, and FIG. 8 is a plan view illustrating the same. Referring to FIGS. 7 and 8, plasma actuator 300 includes dielectric layer 11, front surface electrode 12 provided on a front surface of dielectric layer 11, back surface electrode 13 provided on a side of a back surface of dielectric layer 11 in a direction (the X direction) in which an induced flow along the front surface is generated from front surface electrode 12, floating conductor pair 314 provided between front surface electrode 12 and back surface electrode 13, and high-voltage high-frequency power supply 19 in which output part 19a is connected to back surface electrode 13 via wiring 18. Front surface electrode 12 is grounded via wiring 16. Front surface electrode 12, back surface electrode 13, and floating conductor pair 314 extend in the Y direction. Plasma actuator 300 is a variation of plasma actuator 10 of Embodiment 1 illustrated in FIG. 1, and is configured in the same manner as plasma actuator 10 except that floating conductor pair 314 is different.

Floating conductor pair 314 includes front surface conductor 81, coated conductor wire strip 85 in which a plurality of coated conductor wires 84, each of which includes conductive wire 83 coated with coating member 82 of a dielectric material, is arranged to be formed in a strip shape and one ends of conductive wires 83 are electrically connect to each other, and wiring part 86 that electrically connects front surface conductor 81 and conductive wires 83 of coated conductor wire strip 85. Since each conductive wire 83 is coated with coating member 82 of the dielectric material, the front surface of coated conductor wire strip 85 is electrically insulated. As illustrated in FIGS. 7 and 8, coated conductor wire strip 85 may be flush-mounted in dielectric layer 11, may be disposed on the front surface of dielectric layer 11, or may be disposed in a recess which is formed in the front surface of dielectric layer 11 and extends in the Y direction.

Coating member 82 is not particularly limited, but it is preferable to use a flexible material such as a PTFE resin (for example, Teflon (registered trademark)) and a silicone resin in terms of being easily disposed on the front surface of the casing having a three-dimensional shape. For conductive wire 83, a metallic material such as copper, gold, silver, tungsten, titanium, stainless steel (SUS), and nickel can be used. Note that, conductive wire 83 may have a circular cross-sectional shape as illustrated in FIG. 7 or an elliptical cross-sectional shape, or may have a thin strip shape with a rectangular cross-sectional shape. In the case of the thin strip shape, it is possible to use a conductive oxide, for example, ITO.

In floating conductor pair 314, front surface conductor 81 and conductive wires 83 of coated conductor wire strip 85 are electrically connected by wiring part 86 to have the same potential. Floating conductor pair 314 is in a state of electrically floating.

Plasma actuator 300 has a configuration in which back surface conductor 14b in plasma actuator 10 of Embodiment 1 illustrated in FIGS. 1 and 2 is replaced with coated conductor wire strip 85. Accordingly, plasma actuator 300 has the same operation and effect as plasma actuator 10, and a detailed description thereof will be omitted. Further, plasma actuator 300 uses coated conductor wire strip 85, thereby making it possible to omit the labor of electrical insulation as in the case of using a back surface conductor and to avoid a short circuit with an outside conductive member or a conductive member of the casing.

Plasma actuator 300 may ground back surface electrode 13 and connect front surface electrode 12 to output part 19a of high-voltage high-frequency power supply 19. Experiments demonstrate that even in this case, nearly the same induced flow velocity can be obtained under the same voltage application conditions.

Figure 9:
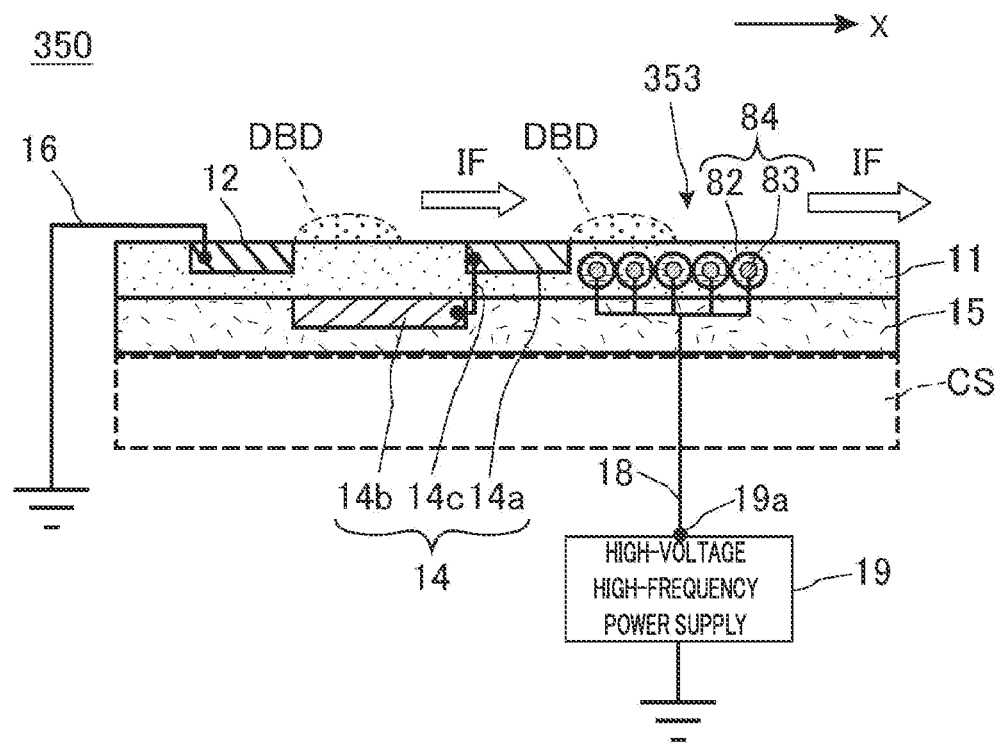
FIG. 9 is a cross-sectional view illustrating a schematic configuration of a plasma actuator according to Embodiment 4 of the present invention.

FIG. 9 is a cross-sectional view illustrating a schematic configuration of a plasma actuator according to Embodiment 4 of the present invention. Referring to FIG. 9, plasma actuator 350 includes dielectric layer 11, front surface electrode 12 provided on a front surface of dielectric layer 11, coated conductor wire strip 353 as a back surface electrode provided on a side of a back surface of dielectric layer 11 in a direction (the X direction) in which an induced flow along the front surface is generated from front surface electrode 12, floating conductor pair 14 provided between front surface electrode 12 and coated conductor wire strip 353, and high-voltage high-frequency power supply 19 in which output part 19a is connected to coated conductor wire strip 353 via wiring 18. Front surface electrode 12 is grounded via wiring 16. Front surface electrode 12, coated conductor wire strip 353, and floating conductor pair 14 extend in the Y direction. Plasma actuator 350 is a variation of plasma actuator 10 of Embodiment 1 illustrated in FIG. 1, and is configured in the same manner as plasma actuator 10 except that the back surface electrode is coated conductor wire strip 353.

In coated conductor wire strip 353, a plurality of coated conductor wires 84, each of which includes conductive wire 83 coated with coating member 82 of a dielectric material, is arranged to be formed in a strip shape and one ends of conductive wires 83 are electrically connect to each other. Since conductive wire 83 is coated with coating member 82 of the dielectric material, the front surface of coated conductor wire strip 353 is electrically insulated. Coated conductor wire strip 353 may be flush-mounted in dielectric layer 11, may be disposed on the front surface of dielectric layer 11, or may be disposed in a recess which is formed in the front surface of dielectric layer 11 and extends in the Y direction.

Since output part 19a of high-voltage high-frequency power supply 19 is connected to conductive wires 83 of coated conductor wire strip 353, a high-frequency high voltage is applied between coated conductor wire strip 353 and front surface electrode 12. Plasma actuator 350 has a configuration in which back surface electrode 13 in plasma actuator 10 of Embodiment 1 illustrated in FIGS. 1 and 2 is replaced with coated conductor wire strip 353. Accordingly, plasma actuator 350 has the same operation and effect as plasma actuator 10, and a detailed description thereof will be omitted. Further, plasma actuator 350 uses coated conductor wire strip 353, thereby making it possible to omit the labor of electrical insulation as in the case of using a back surface conductor and to avoid a short circuit with an outside conductive member or a conductive member of the casing.

Note that, plasma actuator 350 may use coated conductor wire strip 85 as the back surface conductor of floating conductor pair 14 as in plasma actuator 300 illustrated in FIG. 7. Thus, sealing layer 15 for electrical insulation of the back surface conductor and the back surface electrode may not be used, and it is easy to attach the plasma actuator to casing CS.

Plasma actuator 350 may ground conductive wires 83 of coated conductor wire strip 353 and connect front surface electrode 12 to output part 19a of high-voltage high-frequency power supply 19. Experiments demonstrate that even in this case, nearly the same induced flow velocity can be obtained under the same voltage application conditions.

Figure 10:
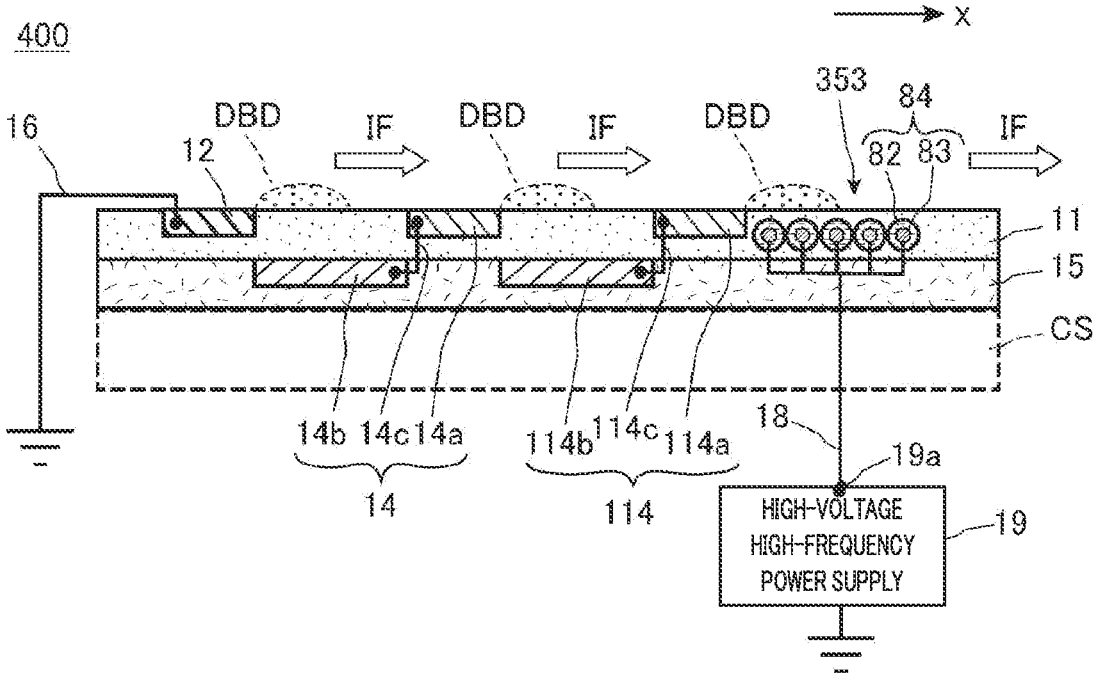
FIG. 10 is a cross-sectional view illustrating a schematic configuration of a variation of the plasma actuator according to Embodiment 4 of the present invention.

FIG. 10 is a cross-sectional view illustrating a schematic configuration of a variation of the plasma actuator according to Embodiment 4 of the present invention. Referring to FIG. 10, plasma actuator 400 includes dielectric layer 11, front surface electrode 12 provided on a front surface of dielectric layer 11, coated conductor wire strip 353 as a back surface electrode provided on a side of a back surface of dielectric layer 11 in a direction (the X direction) in which an induced flow along the front surface is generated from front surface electrode 12, floating conductor pairs 14 and 114 provided between front surface electrode 12 and coated conductor wire strip 353, and high-voltage high-frequency power supply 19 in which output part 19a is connected to coated conductor wire strip 353 via wiring 18. Front surface electrode 12 is grounded via wiring 16. Front surface electrode 12, coated conductor wire strip 353, and floating conductor pairs 14 and 114 extend in the Y direction. Plasma actuator 400 is a variation of plasma actuator 350 of Embodiment 4 illustrated in FIG. 9, and is configured in the same manner as plasma actuator 350 except that floating conductor pair 114 is added between floating conductor pair 14 and coated conductor wire strip 353. Further, plasma actuator 400 is a variation of plasma actuator 100 of another variation of the plasma actuator according to Embodiment 1 illustrated in FIG. 5, and is configured in the same manner as plasma actuator 100 except that back surface electrode 13 is coated conductor wire strip 353. Accordingly, plasma actuator 400 has the same operation and effect as plasma actuator 100, and a detailed description thereof will be omitted. Further, plasma actuator 400 uses coated conductor wire strip 353, thereby making it possible to omit the labor of electrical insulation as in the case of using a back surface conductor and to avoid a short circuit with an outside conductive member or a conductive member of the casing.

Plasma actuator 400 may ground conductive wires 83 of coated conductor wire strip 353 and connect front surface electrode 12 to output part 19*a* of high-voltage high-frequency power supply 19. Experiments demonstrate that even in this case, nearly the same induced flow velocity can be obtained under the same voltage application conditions.

Figure 11:
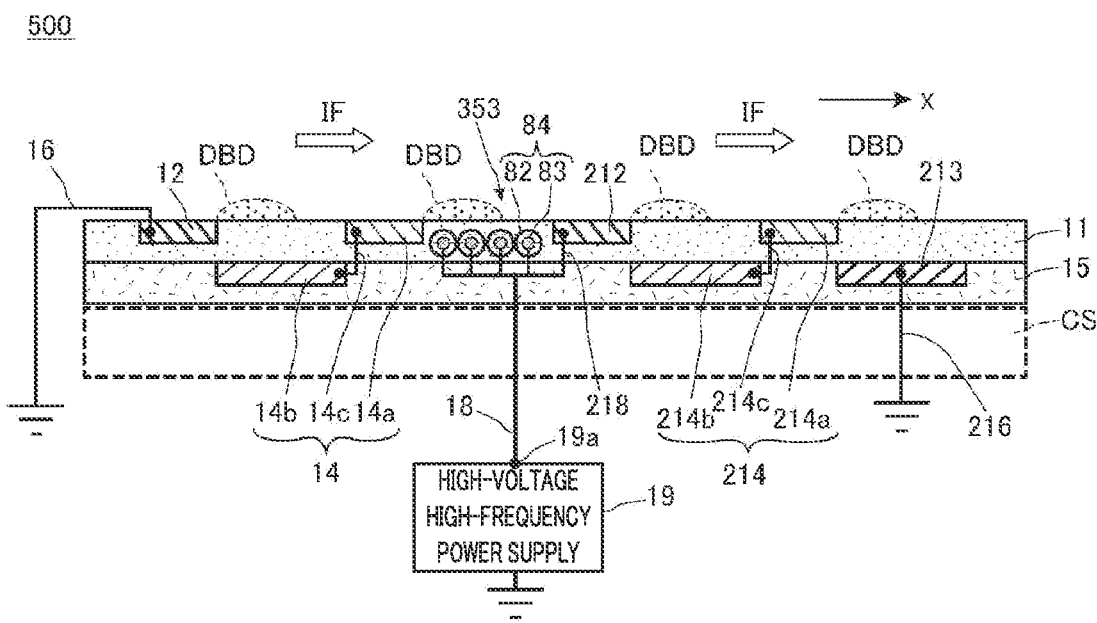
FIG. 11 is a cross-sectional view illustrating a schematic configuration of a plasma actuator according to Embodiment 5 of the present invention.

FIG. 11 is a cross-sectional view illustrating a schematic configuration of a plasma actuator according to Embodiment 5 of the present invention. Referring to FIG. 11, plasma actuator 500 has a configuration in which two plasma actuators 350, where plasma actuator 350 is illustrated in FIG. 9, are combined, and in which output part 19*a* of high-voltage high-frequency power supply 19 is electrically connected to two electrodes (coated conductor wire strip 353 as a back surface electrode and front surface electrode 212) close thereto. Plasma actuator 500 includes dielectric layer 11, front surface electrode 12 and front surface electrode 212 provided on a front surface of dielectric layer 11, and coated conductor wire strip 353 and back surface electrode 213 provided on a side of a back surface of dielectric layer 11. Coated conductor wire sari 353, front surface electrode 212, and back surface electrode 213 are disposed in this order in a direction (the X direction) in which an induced flow is produced from front surface electrode 12 in plan view.

Plasma actuator 500 includes floating conductor pair 14 between front surface electrode 12 and coated conductor wire strip 353 and floating conductor pair 214 between front surface electrode 212 and back surface electrode 213. The configuration of floating conductor pairs 14 and 214 is the same as that in plasma actuator 200 according to Embodiment 2 illustrated in FIG. 6.

Plasma actuator 500 has a configuration in which back surface electrode 13 of plasma actuator 200 according to Embodiment 2 illustrated in FIG. 6 is replaced with coated conductor wire strip 353. Accordingly, plasma actuator 500 has the same operation and effect as plasma actuator 200, and a detailed description thereof will be omitted. Further, plasma actuator 500 uses coated conductor wire strip 353, thereby making it possible to omit the labor of electrical insulation as in the case of using a back surface electrode and to avoid a short circuit with an outside conductive member or a conductive member of the casing.

Plasma actuator 500 may ground conductive wires 83 of coated conductor wire strip 353 and connect front surface electrode 12 and back surface electrode 213 to output part 19*a* of high-voltage high-frequency power supply 19. Experiments demonstrate that even in this case, nearly the same induced flow velocity can be obtained under the same voltage application conditions.

Flow characteristics of an induced flow were obtained by using plasma actuator 10 according to Embodiment 1 illustrated in FIGS. 1 and 2. As Example 1, a silicone resin plate having a thickness of 0.4 mm was used as the dielectric layer, and copper foils having a width (the X direction) of 6 mm (the front surface electrode), 9.5 mm (the back surface electrode), 6 mm (the front surface conductor), and 9.5 mm (the back surface conductor), respectively, a length (the Y direction) of 80 mm, and a thickness of 17 μm were used as the front surface electrode, the back surface electrode, the front surface conductor, and the back surface conductor. Note that, the front surface electrode and the front surface conductor were formed on the silicone resin plate.

As a comparative example, a plasma actuator including a front surface electrode and a back surface electrode was used. A silicone resin plate having a thickness of 0.4 mm was used as the dielectric layer, and copper foils having a width (the X direction) of 5 mm (the front surface electrode) and 15 mm (the back surface electrode), respectively, a length (the Y direction) of 100 mm, and a thickness of 17 μm were used as the front surface electrode and the back surface electrode. Note that, the front surface electrode was formed on the silicone resin plate.

As the high-voltage high-frequency power supply, a model manufactured by Matsusada Precision Inc., HAPS-10B40, was used, and a voltage of a sinusoidal wave of 2.5 kV to 9.0 kV and a frequency of 10 kHz was applied as applied voltage Vp between each front surface electrode and each back surface electrode in Example 1 and the comparative example.

Figure 12:
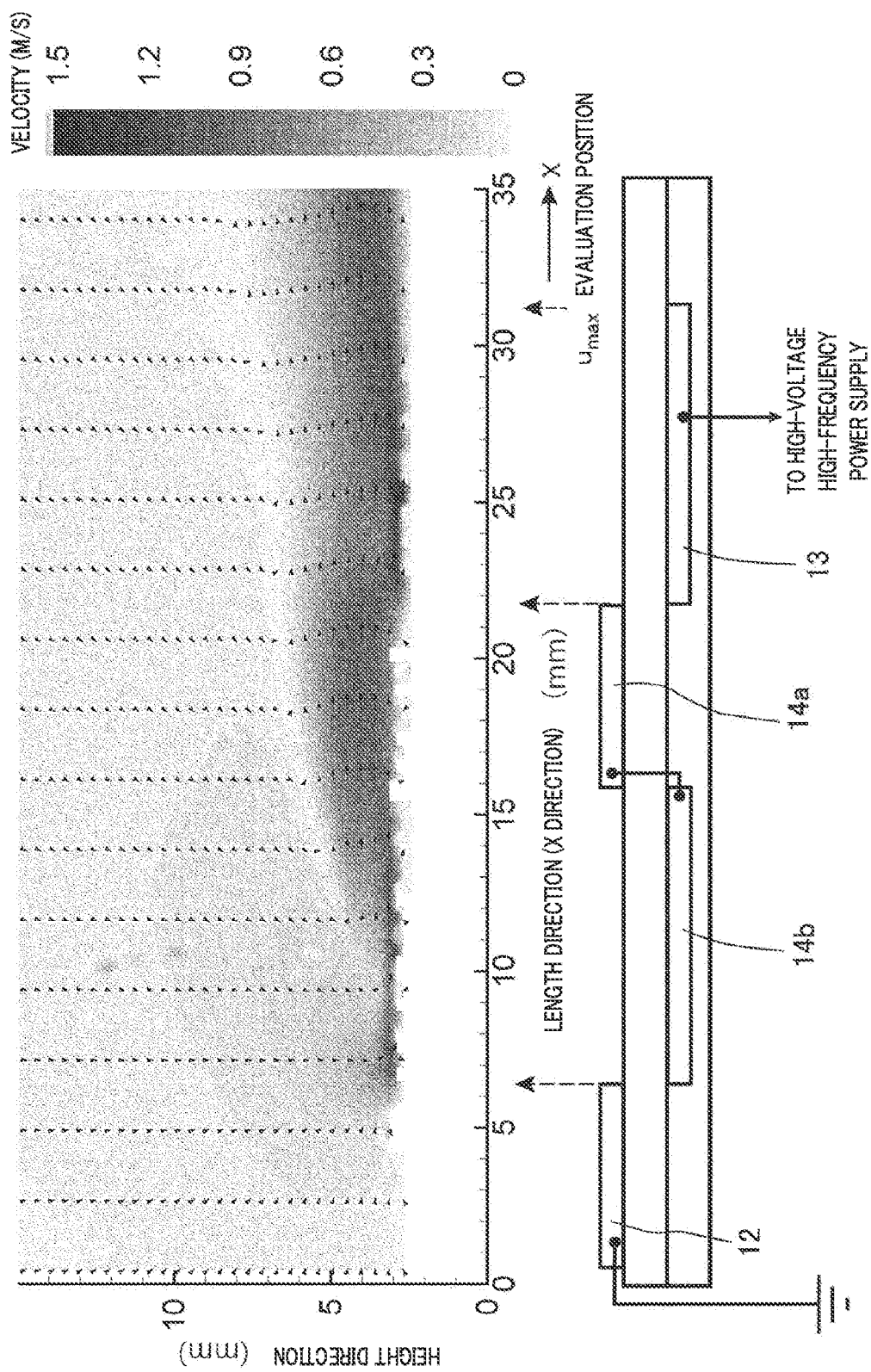
FIG. 12 is an induced flow velocity profile for a plasma actuator of Example 1.

FIG. 12 is an induced flow velocity profile for the plasma actuator of Example 1. The horizontal axis of the velocity profile indicates the length direction (the X direction) of the plasma actuator, and the configuration of the corresponding plasma actuator is indicated below the velocity profile. The leading end part of front surface electrode 12 is at X=6.2 mm, and the leading end part of front surface conductor 14*a* is at X=21.7 mm. The vertical axis indicates the height direction, and the front surface of the dielectric layer is located at 2 mm. The velocity profile indicates the direction of an induced flow with the direction of an arrow, and indicates the induced flow velocity with the length of the arrow and gradation. The relationship between the gradation and the velocity is indicated at the right of the velocity profile. The induced flow velocity distribution was analyzed by particle image velocimetry (PIV).

Referring to FIG. 12, it can be seen that an induced flow in the X direction was generated from the vicinity of the front surface of the dielectric layer in the vicinity of the leading end part of front surface electrode 12 and the induced flow velocity increased from the vicinity of the leading end part of front surface conductor 14*a*. The evaluation position of maximum induced flow velocity $u_{max}$ is located at 25 mm (X=31.2 mm) from the leading end part of front surface electrode 12, and $u_{max}$ (average value in 300 times) was 1.06 m/s. The power consumption at this time was 49.8 W/m.

Figure 13:
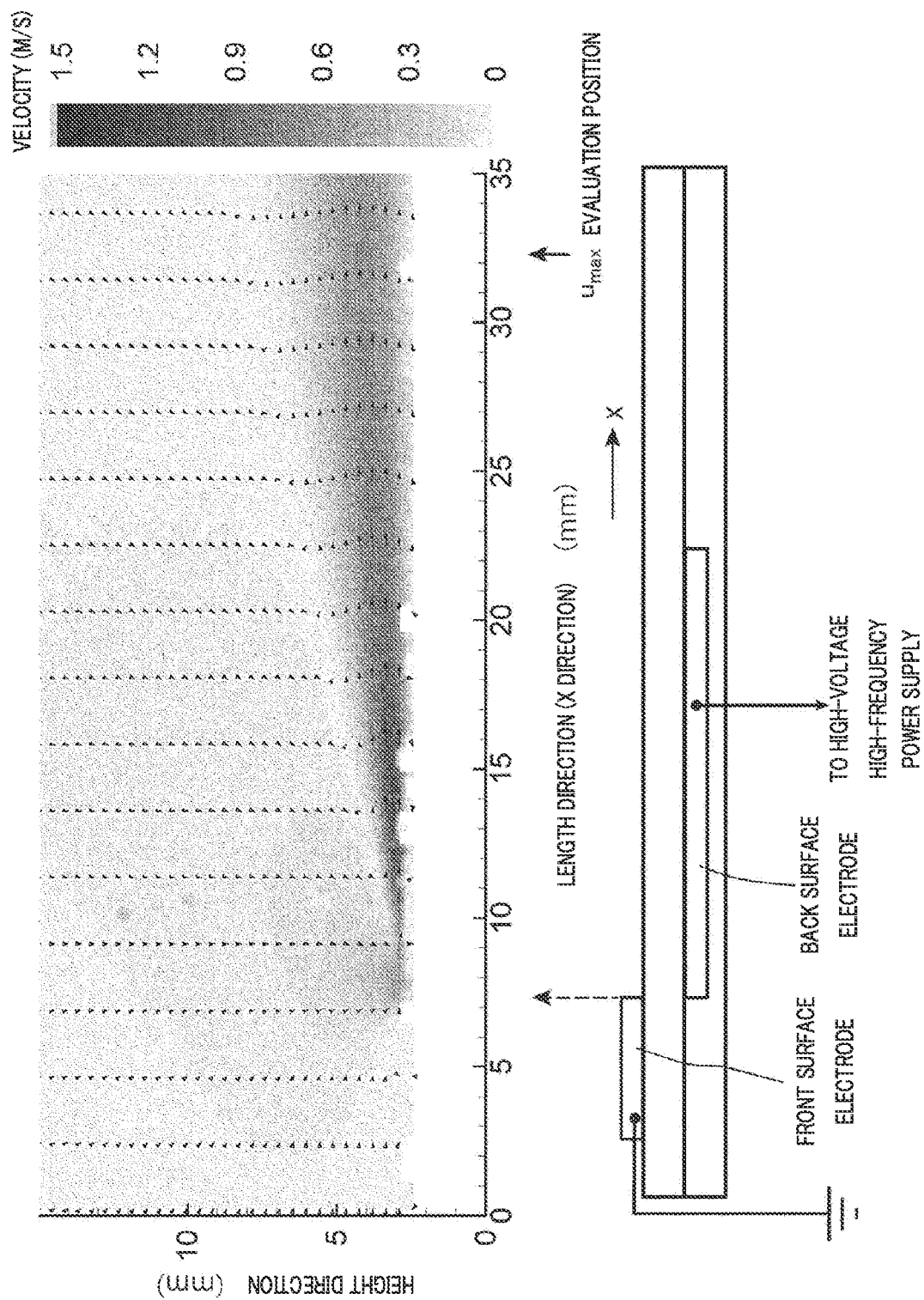
FIG. 13 is an induced flow velocity profile for a plasma actuator of a comparative example.

FIG. 13 is an induced flow velocity profile for the plasma actuator of the comparative example. The velocity profile is illustrated in the same manner as in FIG. 12. The leading end part of front surface electrode 12 is at X=7.2 mm. The front surface of the dielectric layer is located at 2 mm in height.

Referring to FIG. 13, it can be seen that an induced flow in the X direction was generated from the vicinity of the front surface of the dielectric layer in the vicinity of the leading end part of the front surface electrode, and the induced flow velocity was substantially saturated at a position of 13 mm (X=20 mm) from the leading end part. The evaluation position of maximum induced flow velocity $u_{max}$ is at 25 mm (X=32.2 mm) from the leading end part of the front surface electrode, and $u_{max}$ (average value in 300 times) was 0.62 m/s. The power consumption at this time was 44.2 W/m.

Figure 14:
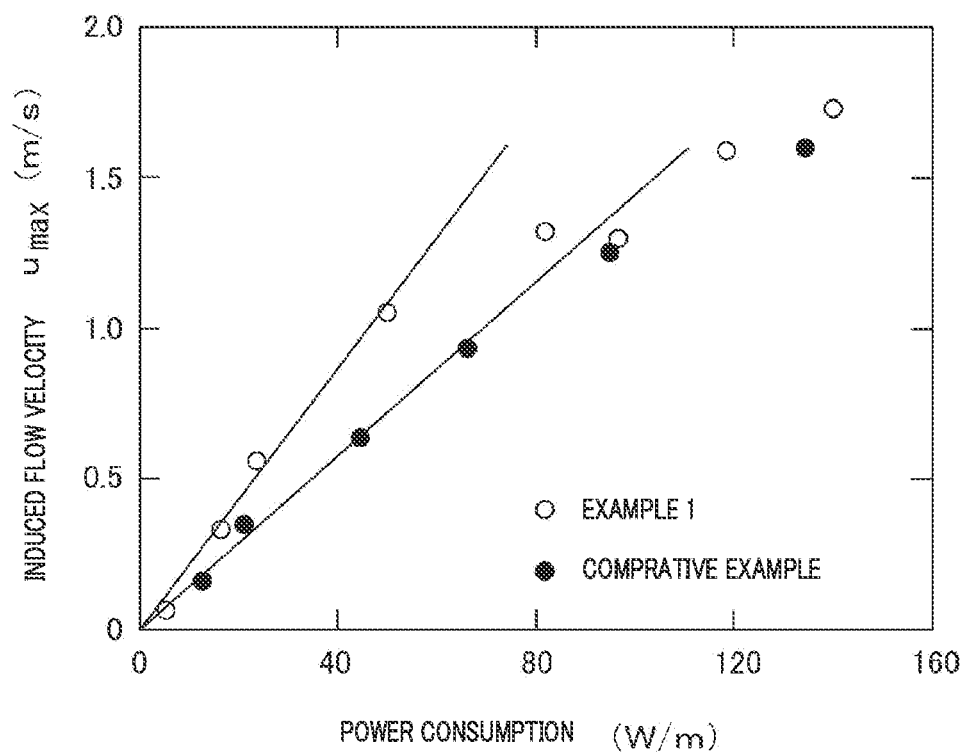
FIG. 14 illustrates relationships between a maximum induced flow velocity and power consumption for the plasma actuators of Example 1 and the comparative example.

FIG. 14 illustrates relationships between maximum induced flow velocity $u_{max}$ and power consumption for the plasma actuators of Example 1 and the comparative example. Induced flow velocity profiles at various power consumptions were measured to obtain maximum induced flow velocities $u_{max}$ at the evaluated positions indicated in FIGS. 12 and 13.

Referring to FIG. 14, it can be seen that when the power consumption was equal to or less than 80 W/m, the induced flow velocity with respect to the power consumption in Example 1 was apparently enhanced more than in the comparative example. When linear regression equations are determined in this range and are compared with each other at the same power consumption, it is found that the velocity in Example 1 is approximately 1.5 times the velocity in the comparative example. Thus, it can be seen that a higher efficiency was achieved in Example 1 than in the comparative example.

As Example 2, flow characteristics of an induced flow were obtained by using plasma actuator 200 according to Embodiment 2 illustrated in FIG. 6. The materials and sizes of the dielectric layer, the front surface electrode, the back surface electrode, the front surface conductor and the back surface conductor in Example 2 were the same as those in Example 1. The front surface electrode and the front surface conductor were formed on the silicone resin plate. As the high-voltage high-frequency power supply, a model manufactured by PSI Corporation, PSI-PG109R5M, was used, and a voltage of a pseudo rectangular wave of 9.0 kV and a frequency of 9.6 kHz was applied as applied voltage Vp between front surface electrode 12 and back surface electrode 13 and between front surface electrode 212 and back surface electrode 213.

Figure 15:
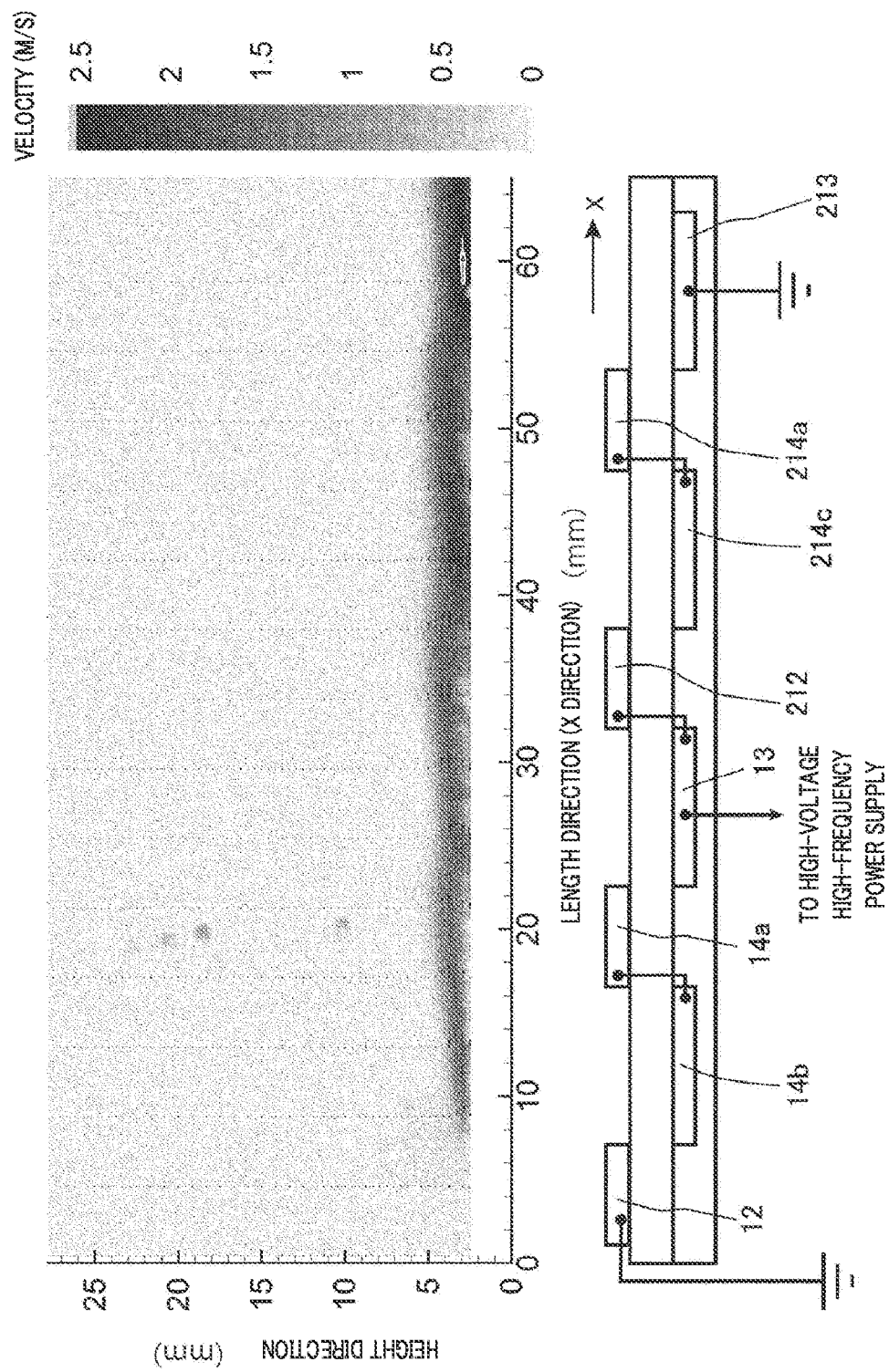
FIG. 15 is an induced flow velocity profile for a plasma actuator of Example 2.

FIG. 15 is an induced flow velocity profile for the plasma actuator of Example 2. The velocity profile has the same specification as in FIGS. 12 and 13. The front surface of the dielectric layer is located at 2 mm in the height direction.

Referring to FIG. 15, it can be seen that an induced flow in the X direction was generated from the vicinity of the front surface of the dielectric layer in the vicinity of the leading end part of front surface electrode 12, and the induced flow velocity increased from the vicinity of each leading end part of front surface conductor 14*a*, front surface electrode 212, and front surface conductor 214*a*. Thus, it is found that the configuration of plasma actuator 200 according to Embodiment 2 makes it possible to accelerate an induced flow.

Although the preferred embodiments of the present invention have been described in detail thus far, the present invention is not limited to the specific embodiments and can be modified and changed in various ways within the scope of the present invention described in the scope of the claims. For example, the plasma actuators of the embodiments may be combined with each other.

The plasma actuator of the present invention can be applied to a moving body such as a passenger vehicle, a rapid train, and an aircraft. Further, the plasma actuator of the present invention can be applied to a blade of a high-velocity rotating body such as fluid machinery such as a turbine and a windmill of a wind power generator.

Note that, the following appendices are disclosed as further embodiments with respect to the foregoing description.

(Appendix 1) A plasma actuator that allows an induced flow to be generated, the plasma actuator including:
 a dielectric layer;
 a first electrode provided on a front surface of the dielectric layer;
 a second electrode provided on a side of a back surface of the dielectric layer in one direction from the first electrode;
 a floating conductor pair provided between the first electrode and the second electrode and including a front surface conductor disposed on the front surface of the dielectric layer and a back surface conductor disposed on the side of the back surface of the dielectric layer, wherein the front surface conductor and the back surface conductor are electrically connected to each other and are electrically insulated from the first electrode and the second electrode and the back surface conductor and the front surface conductor are disposed in this order in the one direction from the first electrode in plan view; and
 a power supply connected to the first electrode and the second electrode, wherein
 the plasma actuator allows the induced flow to be produced along the front surface of the dielectric layer in the one direction from the first electrode by applying a high-frequency high voltage between the first electrode and the second electrode by the power supply to thereby generate dielectric barrier discharge on the front surface between the first electrode and the back surface conductor and on the front surface between the front surface conductor and the second electrode.

(Appendix 2) The plasma actuator according to appendix 1, wherein a gap length between the front surface conductor and the first electrode is larger than a gap length between the back surface conductor and the first electrode.

(Appendix 3) The plasma actuator of appendix 1 or 2, wherein a width of the front surface conductor is equal to or shorter than the first electrode.

(Appendix 4) The plasma actuator according to any one of appendices 1 to 3, wherein at least one of the first electrode and/or the front surface conductor includes an exposed front surface and is flush-mounted in the front surface of the dielectric layer.

(Appendix 5) The plasma actuator according to any one of appendices 1 to 4, wherein at least one of the first electrode and/or the front surface conductor includes a cross section along the one direction, the cross section being formed to be gradually narrowed toward a leading end part of the at least one of the first electrode and/or the front surface conductor in the one direction.

(Appendix 6) The plasma actuator according to any one of appendices 1 to 5, further including at least one other floating conductor pair between the floating conductor pair and the second electrode, the at least one other floating conductor pair including another front surface conductor disposed on the front surface of the dielectric layer and another back surface conductor disposed on the side of the back surface of the dielectric layer, wherein the back surface conductor, the front surface conductor, the other back surface conductor, and the other front surface conductor are arranged in this order in the one direction from the first electrode in plan view.

(Appendix 7) The plasma actuator according to appendix 6, wherein the other front surface conductor includes a cross section along the one direction, the cross section being formed to be gradually narrowed toward a leading end part of the other front surface conductor in the one direction.

(Appendix 8) The plasma actuator according to any one of appendices 1 to 5, wherein at least one of the second electrode and/or the back surface conductor is a coated conductor wire strip in which a plurality of coated conductor wires is arranged, each of the plurality of coated conductor wires including a conductive wire coated with a dielectric material, wherein the plurality of coated conductor wires is electrically connected to each other and is disposed on the front surface of the dielectric layer along another direction perpendicular to the one direction of the first electrode.

(Appendix 9) The plasma actuator according to appendix 8, wherein the coated conductor wire strip is disposed in a recess provided in the front surface of the dielectric layer.

(Appendix 10) The plasma actuator according to appendix 8 or 9, wherein the coated conductor wire strip is flush-mounted in the dielectric layer.

(Appendix 11) A plasma actuator that allows an induced flow to be generated, the plasma actuator including:
   a dielectric layer;
   a first electrode and a third electrode that are provided on a front surface of the dielectric layer;
   a second electrode and a fourth electrode that are provided on a side of a back surface of the dielectric layer, wherein the second electrode, the third electrode, and the fourth electrode are disposed in this order in one direction from the first electrode in plan view;
   a first floating conductor pair provided between the first electrode and the second electrode and including a first front surface conductor disposed on the front surface of the dielectric layer and a first back surface conductor disposed on the side of the back surface of the dielectric layer, wherein the first back surface conductor and the first front surface conductor are disposed in this order in the one direction from the first electrode in plan view and the first front surface conductor and the first back surface conductor are electrically connected to each other and are electrically insulated from the first electrode and the second electrode;
   a second floating conductor pair provided between the third electrode and the fourth electrode and including a second front surface conductor disposed on the front surface of the dielectric layer and a second back surface conductor disposed on the side of the back surface of the dielectric layer, wherein the second back surface conductor and the second front surface conductor are disposed in this order in the one direction from the third electrode in plan view and the second front surface conductor and the second back surface conductor are electrically connected to each other and are electrically insulated from the third electrode and the fourth electrode; and
   a power supply connected to the first electrode, the second electrode, the third electrode, and the fourth electrode, wherein
   the plasma actuator allows the induced flow to be produced along the front surface of the dielectric layer in the one direction from the first electrode by applying a high-frequency high voltage between the first electrode and the second electrode and between the third electrode and the fourth electrode by the power supply to thereby generate dielectric barrier discharge on each of the front surface of the dielectric layer between the first electrode and the first back surface conductor, the front surface of the dielectric layer between the first front surface conductor and the second electrode, the front surface of the dielectric layer between the third electrode and the second back surface conductor, and the front surface of the dielectric layer between the second front surface conductor and the fourth electrode.

(Appendix 12) The plasma actuator of appendix 11, wherein at least one of the first electrode, the first front surface conductor, the third electrode, and/or the second front surface conductor is flush-mounted in the front surface of the dielectric layer.

(Appendix 13) The plasma actuator according to appendix 11 or 12, wherein at least one of the first electrode, the first front surface conductor, the third electrode, and/or the second front surface conductor includes a cross section along the one direction, the cross section being formed to be gradually narrowed toward a leading end part of the at least one of the first electrode, the first front surface conductor, the third electrode, and/or the second front surface conductor in the one direction.

(Appendix 14) The plasma actuator according to any one of appendices 11 to 13, wherein the first electrode and the fourth electrode are grounded, and the second electrode and the third electrode are connected to an output part of the power supply.

(Appendix 15) The plasma actuator according to any one of appendices 11 to 14, wherein at least one of the second electrode and/or the fourth electrode is a coated conductor wire strip in which a plurality of coated conductor wires is arranged, each of the plurality of coated conductor wires including a conductive wire coated with a dielectric material, wherein the plurality of coated conductor wires is electrically connected to each other and is disposed on the front surface of the dielectric layer along another direction perpendicular to the one direction of the first electrode.

(Appendix 16) The plasma actuator according to any one of appendices 11 to 15, wherein at least one of the first back surface conductor and/or the second back surface conductor is a coated conductor wire strip in which a plurality of coated conductor wires is arranged, each of the plurality of coated conductor wires including a conductive wire coated with a dielectric material, wherein the plurality of coated conductor wires is electrically connected to each other, and the coated conductor wire strip is disposed on the front surface of the dielectric layer along another direction perpendicular to the one direction of the first electrode.

(Appendix 17) The plasma actuator according to appendix 15 or 16, wherein the coated conductor wire strip is disposed in a recess provided in the front surface of the dielectric layer.

(Appendix 18) The plasma actuator of any one of appendices 15 to 17, wherein the coated conductor wire strip is flush-mounted in the dielectric layer.

(Appendix 19) The plasma actuator of any one of appendices 11 to 18, further including at least one other floating conductor pair in the one direction of at least one of the first floating conductor pair and the second floating conductor pair.

REFERENCE SIGNS LIST 10, 50, 100, 200, 300, 350, 400, 500 Plasma actuator
11 Dielectric layer
12, 52, 212 Front surface electrode
13, 213 Back surface electrode
14, 54, 114, 214, 314 Floating conductor pair
14a, 54a, 81, 114a, 214a Front surface conductor
14b, 54b, 114b, 214b Back surface conductor
15 Sealing layer
19 High-voltage high-frequency power supply
82 Coating member
83 Conductive wire
84 Coated conductor wire
85, 353 Coated conductor wire strip

What is claimed is:
1. A plasma actuator that allows an induced flow to be generated, the plasma actuator comprising:
   a dielectric layer;

a first electrode provided on a front surface of the dielectric layer;

a second electrode provided on a side of a back surface of the dielectric layer in one direction from the first electrode;

a floating conductor pair provided between the first electrode and the second electrode and including a front surface conductor disposed on the front surface of the dielectric layer and a back surface conductor disposed on the side of the back surface of the dielectric layer, wherein the front surface conductor and the back surface conductor are electrically connected to each other and are electrically insulated from the first electrode and the second electrode and the back surface conductor and the front surface conductor are disposed in this order in the one direction from the first electrode in plan view; and a power supply connected to the first electrode and the second electrode, wherein the plasma actuator allows the induced flow to be produced along the front surface of the dielectric layer in the one direction from the first electrode by applying a high-frequency high voltage between the first electrode and the second electrode by the power supply to thereby generate dielectric barrier discharge on the front surface between the first electrode and the back surface conductor and on the front surface between the front surface conductor and the second electrode.

2. The plasma actuator according to claim 1, wherein a gap length between the front surface conductor and the first electrode is larger than a gap length between the back surface conductor and the first electrode.

3. The plasma actuator according to claim 1, wherein a width of the front surface conductor is equal to or shorter than the first electrode.

4. The plasma actuator according to claim 1, wherein at least one of the first electrode and/or the front surface conductor includes an exposed front surface and is flush-mounted in the front surface of the dielectric layer.

5. The plasma actuator according to claim 1, wherein at least one of the first electrode and/or the front surface conductor includes a cross section along the one direction, the cross section being formed to be gradually narrowed toward a leading end part of the at least one of the first electrode and/or the front surface conductor in the one direction.

6. The plasma actuator according to claim 1, wherein at least one of the second electrode and/or the back surface conductor is a coated conductor wire strip in which a plurality of coated conductor wires is arranged, each of the plurality of coated conductor wires including a conductive wire coated with a dielectric material, wherein the plurality of coated conductor wires is electrically connected to each other and is disposed on the front surface of the dielectric layer along another direction perpendicular to the one direction of the first electrode.

7. The plasma actuator according to claim 6, wherein the coated conductor wire strip is disposed in a recess provided in the front surface of the dielectric layer.

8. The plasma actuator according to claim 6, wherein the coated conductor wire strip is flush-mounted in the dielectric layer.

9. A plasma actuator that allows an induced flow to be generated, the plasma actuator comprising:

a dielectric layer;

a first electrode and a third electrode that are provided on a front surface of the dielectric layer;

a second electrode and a fourth electrode that are provided on a side of a back surface of the dielectric layer, wherein the second electrode, the third electrode, and the fourth electrode are disposed in this order in one direction from the first electrode in plan view;

a first floating conductor pair provided between the first electrode and the second electrode and including a first front surface conductor disposed on the front surface of the dielectric layer and a first back surface conductor disposed on the side of the back surface of the dielectric layer, wherein the first back surface conductor and the first front surface conductor are disposed in this order in the one direction from the first electrode in plan view and the first front surface conductor and the first back surface conductor are electrically connected to each other and are electrically insulated from the first electrode and the second electrode;

a second floating conductor pair provided between the third electrode and the fourth electrode and including a second front surface conductor disposed on the front surface of the dielectric layer and a second back surface conductor disposed on the side of the back surface of the dielectric layer, wherein the second back surface conductor and the second front surface conductor are disposed in this order in the one direction from the third electrode in plan view and the second front surface conductor and the second back surface conductor are electrically connected to each other and are electrically insulated from the third electrode and the fourth electrode; and a power supply connected to the first electrode, the second electrode, the third electrode, and the fourth electrode, wherein the plasma actuator allows the induced flow to be produced along the front surface of the dielectric layer in the one direction from the first electrode by applying a high-frequency high voltage between the first electrode and the second electrode and between the third electrode and the fourth electrode by the power supply to thereby generate dielectric barrier discharge on each of the front surface of the dielectric layer between the first electrode and the first back surface conductor, the front surface of the dielectric layer between the first front surface conductor and the second electrode, the front surface of the dielectric layer between the third electrode and the second back surface conductor, and the front surface of the dielectric layer between the second front surface conductor and the fourth electrode.

10. The plasma actuator according to claim 9, wherein at least one of the first electrode, the first front surface conductor, the third electrode, and/or the second front surface conductor is flush-mounted in the front surface of the dielectric layer.

11. The plasma actuator according to claim 9, wherein at least one of the first electrode, the first front surface conductor, the third electrode, and/or the second front surface conductor includes a cross section along the one direction, the cross section being formed to be gradually narrowed toward a leading end part of the at least one of the first electrode, the first front surface conductor, the third electrode, and/or the second front surface conductor in the one direction.

12. The plasma actuator according to claim 9, wherein at least one of the second electrode and/or the fourth electrode is a coated conductor wire strip in which a plurality of coated conductor wires is arranged, each of the plurality of coated conductor wires including a conductive wire coated with a dielectric material, wherein the plurality of coated conductor wires is electrically connected to each other and is disposed on the front surface of the dielectric layer along another direction perpendicular to the one direction of the first electrode.

13. The plasma actuator according to claim 9, wherein at least one of the first back surface conductor and/or the second back surface conductor is a coated conductor wire strip in which a plurality of coated conductor wires is arranged, each of the plurality of coated conductor wires including a conductive wire coated with a dielectric material, wherein:

the plurality of coated conductor wires is electrically connected to each other, and the coated conductor wire strip is disposed on the front surface of the dielectric layer along another direction perpendicular to the one direction of the first electrode.

14. The plasma actuator according to claim 12, wherein the coated conductor wire strip is disposed in a recess provided in the front surface of the dielectric layer.

15. The plasma actuator according to claim 12, wherein the coated conductor wire strip is flush-mounted in the dielectric layer.

* * * * *